July 14, 1931. S. W. BRANER 1,814,283
GASKET
Filed Oct. 15, 1928 2 Sheets-Sheet 1
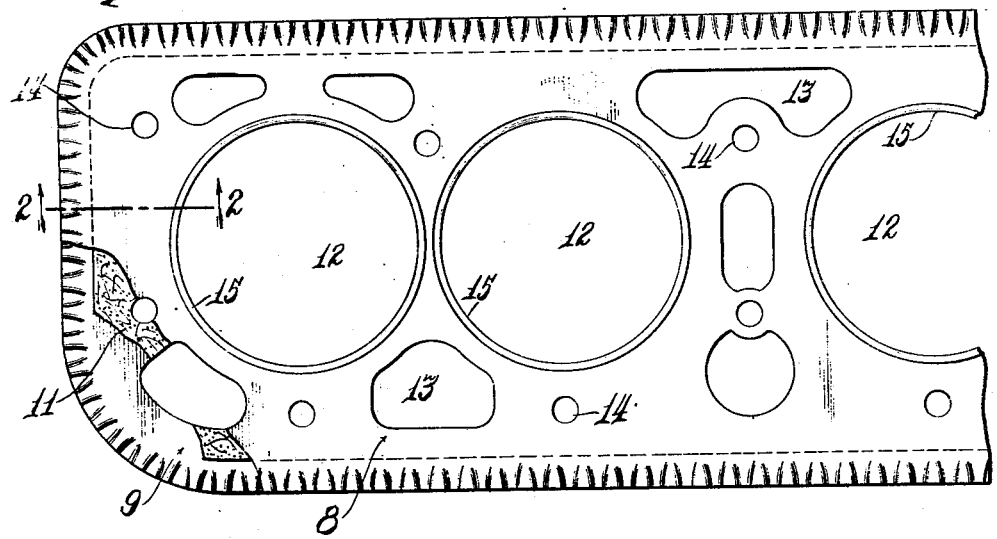
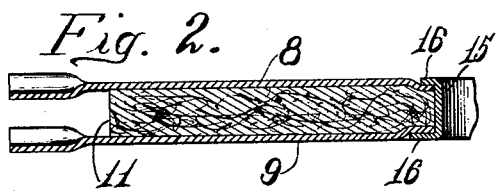
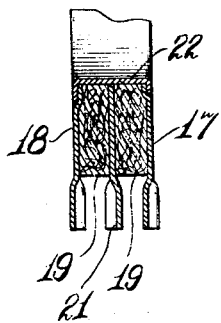
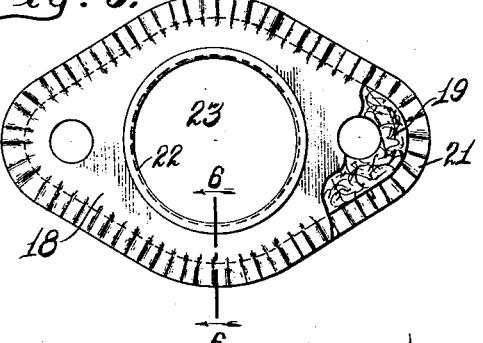
Inventor
Stephen W. Braner
Daniel P. Brennan
Attorney July 14, 1931. S. W. BRANER 1,814,283
GASKET
Filed Oct. 15, 1928 2 Sheets-Sheet 2
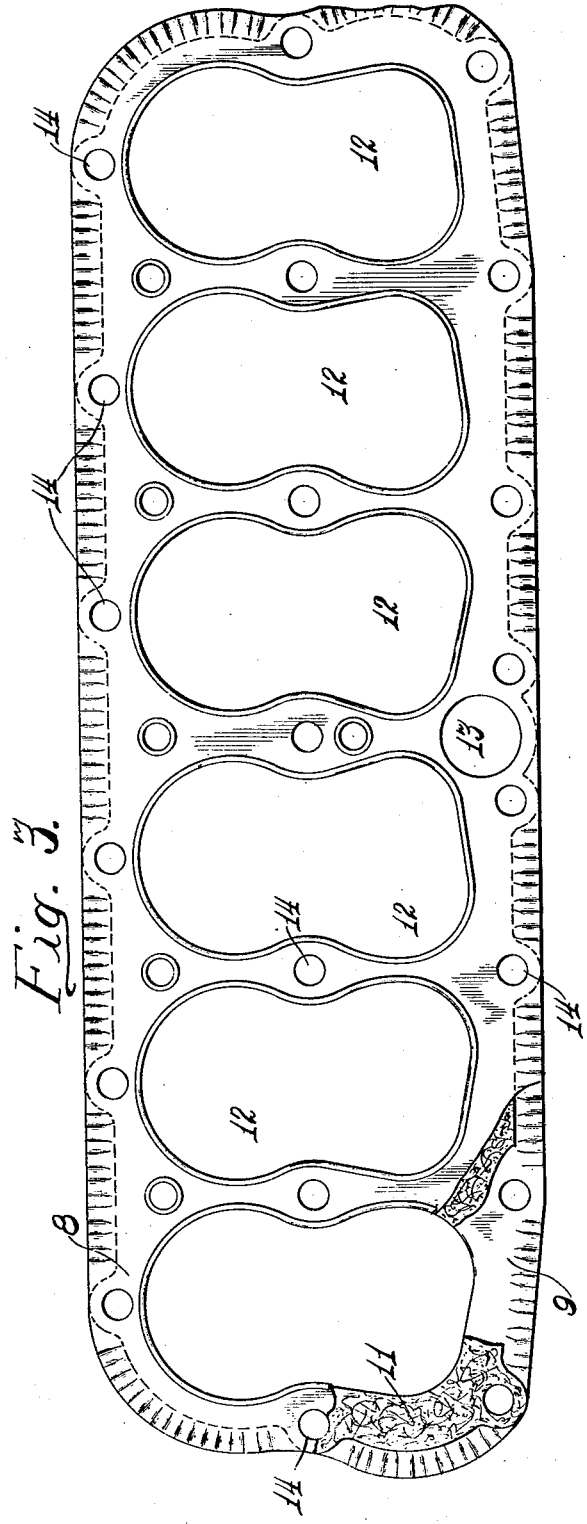
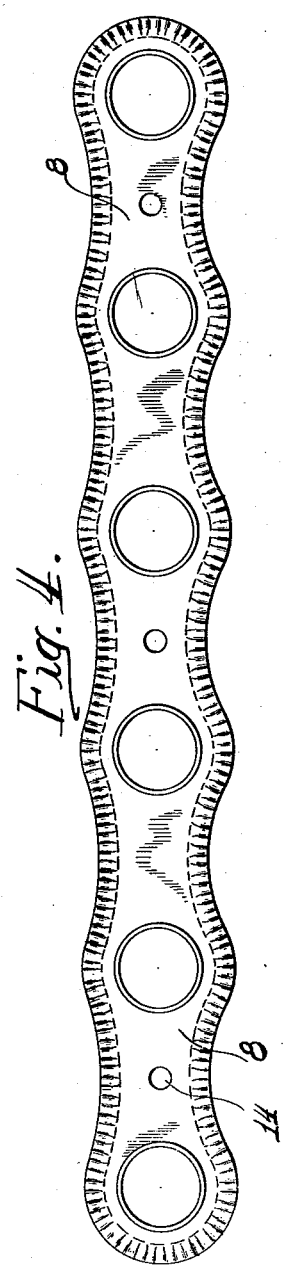
Inventor
Stephen W. Braner
Daniel P. Brennan
Attorney Patented July 14, 1931

1,814,283

UNITED STATES PATENT OFFICE

STEPHEN W. BRANER, OF CHICAGO, ILLINOIS, ASSIGNOR TO VICTOR MANUFACTURING & GASKET CO., A CORPORATION OF ILLINOIS

GASKET

Application filed October 15, 1928. Serial No. 312,534.

This invention relates to improvements in gaskets and particularly to self-cooling gaskets adapted for use on internal combustion engines.

It is an object of the invention to form a gasket with means for carrying off the heat, which heat in prior structures caused the gasket to burn out or leak, and in time utterly destroyed the usefulness of the gasket, especially those gaskets used between the cylinder block and head and those used between the exhaust ports and manifolds of an internal combustion engine. Of course, gaskets of this construction are adapted for use on other parts of an engine, but the principal value of the gasket is on parts where intense heat is generated.

An object of the invention is to form gaskets, of usual types, such as those having outer and inner layers of metallic material and refractory material therebetween, with the edges of the gasket so arranged as to provide a cooling space.

Another object of the invention is to form means on the gasket to extend beyond the parts with which it is to contact to carry off excessive heat.

Another object of the invention is to form a gasket of this kind with means provided at the edges arranged to carry off the heat, and so formed as to give an increased amount of surface, as for instance by corrugating the edges.

It is also an object of the invention to form a gasket of this kind with means for holding the various layers against displacement, and the openings therein in alignment with each other.

With these and other objects in view, preferred embodiments of the invention are illustrated in the accompanying drawings, in which:

Figure 1 is a fragmental plan view of a cylinder head gasket, embodying the features of my invention.

Figure 2 is a section taken along line 2—2 of Fig. 1.

Figure 3 is a modified form of the gasket shown in Fig. 1.

Figure 4 is still another modified form of the gasket shown in Fig. 1.

Figure 5 is a form of exhaust port gasket.

Figure 6 is a sectional view taken on line 6—6 of Fig. 5.

Figure 7 is a fragmental end view of the gasket shown in Figures 1, 3, and 4.

The embodiment of cylinder head gasket shown in Fig. 1 includes preferably top and bottom metallic layers 8 and 9 respectively, made of sheet copper, or the like, and has a resilient filler of flexible refractory material, such as asbestos 11. This gasket is in all respects a typical cylinder head gasket for use on an internal combustion engine, and is provided with the usual openings 12 substantially the size of the bore of the cylinders upon which it is to be used. Other openings 13, to accommodate the water jacket openings, as well as openings 14 to fit over the cylinder head bolts are provided.

The metallic layers 8 and 9 and the resilient layer 11 are preferably held against displacement by a plurality of reinforcing members 15 disposed respectively in the openings 12, and having external annular flanges 16 engaging the external faces of the gasket around the openings 12. The resilient filler 11 stops short of the edge of the gasket to provide a cooling space between the external margins of the layers 8 and 9, and these margins, as here illustrated, are corrugated to provide a substantial cooling surface. The perimeter of the resilient member is substantially the same as that of the cylinder block and head to register therewith, while the layers 8 and 9 are large enough to extend beyond the resilient member and cylinder head and block to contact with the air and thus effect the cooling of the gasket. However, in some instances where desired the flexible layer may stop short of the cylinder block so that the outer edges of the outer layers will align with the outside of the cylinder block, thus forming a gasket that is flush with the outer edges of the cylinder block and still provides a cooling space.

The form of gasket shown in Fig. 3 is in all respects similar to that shown in Fig. 1, excepting that the cooling edge is only provided between the marginal bolt holes.

The gasket illustrated in Fig. 4 is simply another form of that shown in Fig. 1, adapted for use upon the manifold, especially the exhaust manifold where heat is usually intense.

The form of gasket illustrated in Figures 5 and 6 is especially adapted for use upon an exhaust manifold, but this construction may also be used on a cylinder head gasket or gaskets adapted for use on other places on the engine, and includes outer layers 17 and 18 and a plurality of resilient layers 19, provided with a spacer layer 21 preferably of metallic material. The layers may be held together against displacement in any approved manner, and as here shown a reinforcing member 22 is secured around the circumference of the opening 23 and has parallel horizontal external annular flanges engaging the layers 17 and 18.

The principal advantage of this gasket is that it provides means for cooling the gasket, thereby increasing its efficiency and life.

The construction of the gasket is not intended to be limited to the precise embodiments disclosed, but numerous other embodiments are contemplated within the scope of the claims.

I claim:

1. A gasket comprising an outer and inner metallic layer and alternating layers of refractory and metallic material therebetween, said metallic layers extending beyond the edges of said refractory layers to provide a cooling means.

2. A gasket comprising outer metal layers and an interposed filler layer, the marginal edges of said metal layers being corrugated transversely.

3. A gasket comprising outer metal layers and an interposed filler layer, the peripheral edges of said layers aligning and the marginal edges of the metal layers being corrugated transversely.

4. A gasket comprising outer metal layers and an interposed filler layer, the marginal edges of the metal layers projecting beyond the peripheral edge of the filler layer and being corrugated transversely.

5. A gasket comprising alternately arranged metal and filler layers, the marginal edges of said metal layers being corrugated transversely.

6. A gasket comprising alternately arranged metal and filler layers, the marginal edges of said metal layers projecting beyond the peripheral edges of the filler layers and being corrugated transversely.

7. A gasket comprising outer metal layers and an intermediate metal layer, and filler layers between the outer layers and the intermediate layer, the marginal edges of said metal layers projecting beyond the peripheral edges of the filler layers and being corrugated transversely.

In testimony whereof I affix my signature at 10 South LaSalle Street, Chicago, Illinois.

STEPHEN W. BRANER.